United States Patent Office 3,137,138
Patented June 16, 1964

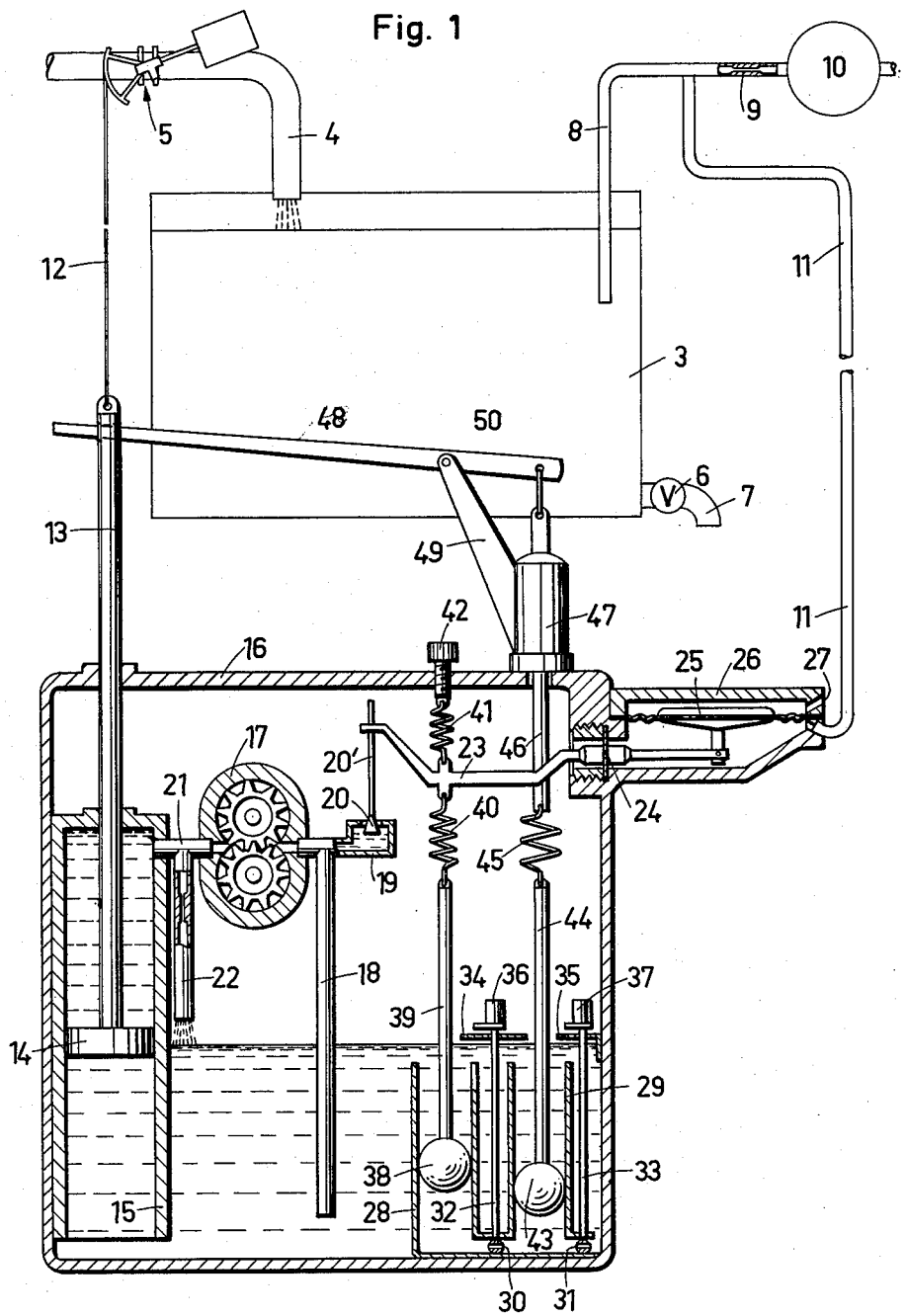

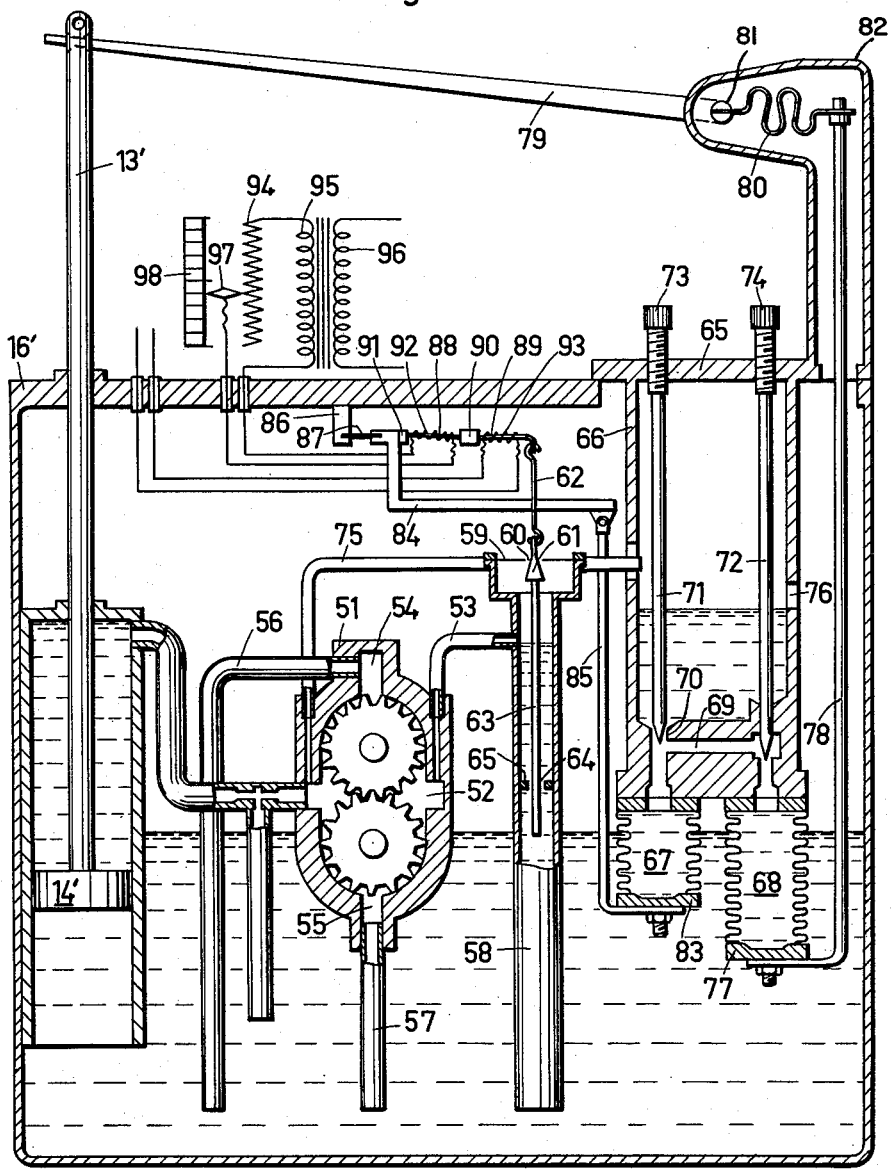

3,137,138
RETURN MECHANISM FOR A REGULATOR
Karl Torsten Källe, Sandbacken, Säffle, Sweden
Filed Sept. 28, 1962, Ser. No. 226,887
Claims priority, application Sweden Mar. 21, 1962
7 Claims. (Cl. 60—52)

The invention relates to a regulator of the type in which means transmitting impulses from a condition to be regulated are arranged to adjust a valve member controlling the supply of pressure fluid to a pressure fluid driven servo motor which in turn, in dependence on the impulses, operates to maintain said condition at a predetermined value. Controllable conditions are, for instance, pressures, temperatures, liquid levels and similar physical magnitudes.

The invention involves a further development of these regulators and has particularly for its object to provide an improved return mechanism which is made dependent on the position and motion of the servo motor in order to obtain a broad variation of the regulation characteristic with respect to different conditions of operation and requirements as to accuracy and speed of regulation. The new mechanism comprises in combination two closed vessels adapted to be filled with liquid and communicating through a passage containing a second valve, each vessel having a movable wall portion, whereby its volume may be varied, a container adapted to be filled with liquid up to a constant level above said vessels, a passage connecting one of the vessels to the container at a point below said liquid level and containing a third valve, means connecting a driven part of the servo motor to the movable wall portion of one of the vessels, and means connecting the movable wall portion of the other vessel to the first valve member, whereby said first valve may be influenced in returning direction by the servo motor to an extent determined by the adjusted positions of said second and third valves.

A particular advantage of the new device is that a return function which may be called a "derivating return" may be introduced in the work of regulation, if the two valves are adjusted suitably.

The two return vessels may consist of cylinders with pistons, but in a preferred embodiment they consist of bellows, as such means can transmit even small forces with great accuracy without sliding friction or sealing problems. Combinations of bellows and cylinders with pistons are also possible. When cylinders are used, either the piston or the cylinder itself may constitute the movable wall portion.

The invention will hereinafter be described with reference to a regulator, in which a hydraulic servo motor is driven by a pump operating with a mixture of liquid and gas. Inlets for liquid and gas are provided on the suction side of the pump and its pressure side has a restricted outlet as well as a connection to the servo motor. The composition of the liquid-gas mixture sucked by the pump is adjusted by means of a valve inserted in the gas inlet and controlled by impulse transmitting means which co-operate with the new return mechanism.

In the drawings, FIGURES 1 and 2 show vertical sections through two different embodiments of the regulator according to the invention. As an example, the regulator in FIG. 1 is mounted to maintain a constant liquid level in a vat by adjusting the supply of liquid in dependence on the rate of discharge.

In FIG. 1, the vat 3 is shown on a scale considerably reduced in relation to the regulator. A conduit 4 for supply of liquid to the vat 3 contains a rotatable valve 5 which is controlled by the regulator, and another valve 6 is inserted in a discharge pipe 7. A bubble tube 8 connected to a source 10 of pressure gas through a restricted passage 9 has its open end immersed in the liquid in the vat to sense the level, and a branch conduit 11 extends from the tube 8 to the regulator to transmit impulses.

In the customary way the supply valve 5 is adjusted and held in position by means of a wire 12 against the action of a counterweight. The wire 12 is connected to the end of a vertical piston rod 13 extending from a piston 14 in a hydraulic cylinder 15 serving as servo motor. The cylinder 15, which has an open lower end, is inserted in a surrounding housing 16 partly filled with oil or another liquid and also containing most of the other movable parts of the regulator.

A gear pump 17 within the housing 16 is adapted to be driven at a constant speed by means of an electric motor (not shown). The suction side of the pump is connected to an air intake 19 as well as to a tube 18 dipping into the liquid. The air intake consists of a valve housing 19 containing a vertically movable, conical valve member 20. The pressure side of the pump 17 is connected to the top of the cylinder 15 by means of a conduit 21, from which an outlet conduit 22 containing a restricted passage is branched downwardly.

The valve member 20 has a spindle 20' which is pivotably suspended at one end of a double-armed lever 23. The lever 23 extends through and is fixed to a diaphragm 24 which is inserted in one vertical wall of the housing 16 to serve as a hinge. The opposite end of the lever is hingedly connected to a horizontal diaphragm 25 within a casing 26 mounted at the outside of the housing 16. The chambers formed on both sides of the diaphragm 25 have outlets which may be connected to sources of different pressures. In the embodiment shown, the lower chamber is connected to the conduit 11 from the bubble tube 8, while the opening 27 of the upper chamber is permitted to communicate with the atmosphere.

As far as hitherto described, the regulator is previously known, and therefore no more detailed explanations should be necessary.

According to the invention, two vessels 28 and 29 designed as vertical cylinders with open upper ends are mounted wholly immersed in the liquid in the housing. The lower portions of the vessels communicate through a passage containing a rotatable valve member 30, and an outlet from the lower portion of the vessel 29 to the surrounding housing 16 is controlled by a rotatable valve member 31. The valve members 30, 31 are mounted on vertical spindles 32 and 33 respectively, which are guided in horizontal plates 34 and 35 respectively attached to the inside of the housing 16. The upper ends of the spindles carry knobs 36, 37 provided with pointers, and the plates 34, 35 are designed with corresponding dials, whereby the valve members 30, 31 may be adjusted into desired, predetermined throttling positions. To enable adjustments the housing 16 may be provided with an opening (not shown) above the liquid level, said opening being covered by a shutter.

The cylinder 28 contains a ball-shaped piston 38 closely fitted therein and fixed to a rod 39 which is suspended in the lever 23 by means of a helical spring 40. The load thus acting upon the lever 23 is counter-acted by another helical spring 41 which connects the lever 23 with a set screw 42 threaded through the upper wall of the housing 16.

Also the cylinder 29 contains a ball-shaped, snugly fitted piston 43. The piston rod 44 has its upper end firmly connected to one end of a helical spring 45 which is essentially heavier than the springs 40, 41. The upper end of the spring 45 is fixed to a vertical rod 46 which projects through an opening in the housing 16. The rod 46 is slidably guided in a sleeve 47 mounted on the top of the housing and its upper end is linked to one end of a double-armed lever 48 which is mounted on a horizontal pivot 50 carried by a bracket 49. The opposite end of the lever 48 is linked to the piston rod 13 of the servo motor.

The two pistons 38, 43 are ball-shaped to secure a snug fitting in the event the piston rods should be subjected to some oscillation. However, disk-like pistons with spherically rounded peripheral surfaces are, of course, equally useful.

In the operation of the regulator described different characteristics of regulation may be obtained by varying the setting positions of the two valves 30, 31. The example of regulation shown in FIG. 1 (maintaining a constant level in a vat) has been chosen exclusively for the sake of simplicity. In the following considerations it will be assumed that the level in the vat 3 is falling due to an increased discharge of liquid. In such case the pressure in the bubble tube 8 and in the conduit 11 will decrease so that the diaphragm 25 causes the lever 23 to swing clockwise in FIG. 1. Thus the valve member 20 throttles the supply of air to the pump 17 which instead sucks more oil, and the piston 14 of the servo motor moves consequently downwards, so that the valve 5 is rotated in opening direction to restore the level in the vat 3.

Firstly, it may be assumed that the valve 30 between the cylinders 28, 29 is wholly open while the valve 31 is closed. On the downward movement of the servo piston 14 the ball 43 is drawn upwardly by the lever 48, and as the valve 30 is open the ball 38 will then move downwards correspondingly so that the spring 40 is stretched. The valve member 20 will thus be caused to move in opening direction, a minor proportion of oil will be supplied to the servo motor and its piston 14 will be adjusted in a little higher position. The function may be denoted as a "proportionating return," which means that the level in the vat 3 slowly approaches its new position of equilibrium without risk for oscillation or over-regulation though at a certain delay of time.

A more effective control is obtained if the valve 31 is opened a little while the valve 30 is wholly open as before. The movement upwards of the piston 38 will then no more correspond exactly to the downward movement of the piston 43, as liquid is also sucked through the valve 31, and the difference between the movements of the pistons will, of course, increase to the extent the valve 31 is opened. The resulting effect will be a modified or "proportionating and integrating return," which means that irrespective of the conditions of operation (increased or decreased discharge from the vat 3) a suitable adjustment of the valve always involves a substantially oscillation-free return to the original value, i.e. in this case a restoration of the original liquid level.

If both the valves 30, 31 are throttled, the space below the piston 43 in the cylinder 29 cannot be filled with liquid sufficiently rapidly to permit an unobstructed lift of the piston 43, when the rod 46 moves upwards, and the result will be that the spring 45 is stretched. Thus the downward movement of the valve-actuating piston 38 will occur more slowly than in the case above, but owing to the power accumulated in the spring 45 the movement will instead continue during a period of time determined by the throttling positions of the valves 30, 31. The function may be denoted as "proportionating, integrating and derivating return" and is of particular interest at a relatively long delay of time between the start of the work of regulation and the moment when the result of said work can be observed at the place from which the impulses are taken. It is also of interest when the condition to be regulated is subjected to rapid and/or great variations. In both cases it is desired that the regulator starts rapidly an effective work for restoring the predetermined value. Assuming, for instance, that the level sinks rapidly in the vat 3 due to a sudden and great increase of the discharge.

From the beginning the supply of liquid must thus be increased to compensate for the increased discharge as well as to restore the original level, and in this respect the derivating function has a favorable action. When, as a result of the great drop of the liquid level, the valve member 20 effectively throttles the supply of air to the pump 17, so that the piston 14 is depressed deeply, this great change will have an opportunity to act during a period of time without being counteracted by the downward movement of the piston 38. When later on the liquid level begins to approach its predetermined value the work of regulation is reduced successively so that said value is reached without oscillation or over-regulation.

In the case the servo piston 14 is instead moved rapidly a great distance upwardly, the derivating return described will function correspondingly, in that the power accumulating spring 45 will be compressed.

As a further possibility of adjustment it is to be noted that the valve 30 may be throttled and the valve 31 closed. The effect may be denoted as "proportionating and derivating return," i.e. the integral function is lacking. The result will be that the value to be controlled varies a little at different conditions of operation. On the other hand, however, the return movement will instead proceed more rapidly.

It may be mentioned that the spring 40 mounted between the rod 39 and the lever 23 is for the main part adapted to damp the movements of the air valve 20 so as to avoid fluttering.

The preferred embodiment shown in FIG. 2 uses a different pump construction requiring small amounts of gas only for operation within a relatively extensive range of adjustment forces. Owing to the reduction of the amount of gas required it is possible to use a small and thus correspondingly sensitive valve member. This new valve is especially suited in combination with the new return mechanism, the effects of which may thereby be still better utilized.

The gear pump 51 has on its suction side a central chamber 52 connected to a gas supply conduit 53. Two separate inlets 54 and 55 for liquid are provided, each located at the periphery of one of the gears at an angular distance of at least two gear pitches from the central chamber 52 and at least two gear pitches from the pressure side of the pump. In the embodiment shown, the angular distance between the chamber 52 and each inlet 54, 55 is about 90°. The inlets are connected to pipes 56 and 57 respectively extending below the liquid level in the housing 16′.

The air supply pipe 53 extends from the upper portion of a considerably thicker, vertical tube 58, the lower end of which is immersed in the liquid in the housing 16′. The upper end of said tube 58 is widened and covered by a thin diaphragm 59 (preferably of steel), which is fixed at its periphery. The diaphragm has a central opening 60 serving as a seat for a conical valve member 61 inserted in the tube 58. The top of the cone 61 projecting above the diaphragm is hooked to a connection rod 62 which in turn is suspended in impulse transmitting means described hereinafter. A spindle 63 fixed to and extending downwards from the valve cone 61 passes through an opening 64 in a radial partition 65 within the tube 58. The openings 60 and 64 have preferably about the same diameter, and the clearance between the spindle 63 and the opening 64 is very small, about 0.1 mm. for instance.

In the operation of the regulator, when the valve cone 61 is throttled, a corresponding underpressure arises in the valve housing 58. Notwithstanding this the valve cone will be substantially statically balanced, as the two openings 60 and 64 are equally great. Also a dynamic balance is obtained by means of the limited flow of liquid through the opening 64. The amounts of liquid introduced in this way are very small and they do not interfere with the intended function of the regulator. In other words, the valve can be dimensioned such that static and dynamic forces acting to depress the valve cone are wholly balanced by forces directed upwards, and the result will be that very small forces are required for adjusting the valve.

When the valve cone 61 is raised to decrease the supply of air, the reduced pressure within the tube 58 causes a depression of the diaphragm 59 onto the cone 61, so that the throttling action is further increased. The effect of the impulses is thus reinforced, i.e. a derivate effect is obtained, which results in a more rapid work of regulation. The result will be the same, if the valve cone 61 is lowered, as the depression of the diaphragm is then decreased, so that the inlet is opened a little more than what corresponds to the movement of the cone 61.

The top of the housing 16' has an opening covered by a cap 65, from which a vessel 66 depends. Two bellows 67 and 68 have each one end plate fixed to the bottom side of the vessel 66, and a U-shaped channel 69 through the thickened bottom wall of the vessel connects central openings provided in said end plates. Above the bellows 67 to the left in FIG. 2 the channel 69 communicates with the interior of the vessel 66 through an opening 70 which is throttled by means of a valve needle 71, and another valve needle 72 throttles the channel 69 between said opening 70 and the bellows 68 to the right. The valve needles 71, 72 are fixed to set screws 73 and 74 respectively threaded through the cap 65 to be manipulated from its outside.

A rather narrow pipe 75 extending from the pressure side of the pump 51 and ending into the vessel 66 at about half its height serves to supply a small amount of liquid, whereby the bellows 67, 68, the channel 69 and also the vessel are kept filled up to a constant level determined by an overflow opening 76.

The lower end plate 77 of the bellows 68 is connected to a vertical rod 78 extending through an opening in the cap 65. The upper end of said rod 78 is connected to one end of a double-arm lever serving to transmit a movement from the piston rod 13'. In the embodiment shown, said lever is composed of a rigid arm 79 linked to the piston rod 13' and a resilient arm 80 connected to the vertical rod 78. The two arms 79, 80 are fixed to each other by means of a pivot 81 journalled in a casing 82 which is mounted on the cap 65 to enclose the arm 80 as well as the upper portion of the rod 78. The resilient arm 80 which may consist of a bent leaf spring has the same function as the spring 45 in FIG. 1, i.e. it serves to accumulate power in the event the bellows 68 (due to the throttling of valve 72) is prevented from following the movement of the arm 79 momentarily.

The bellows 67 communicating directly with the vessel 66 has its lower end plate 83 linked to one end of a lever 84 by means of a vertical connection rod 85. The lever 84 has its opposite end fixed pivotably to a bracket 86 by means of a leaf spring 87 to swing in a vertical plane. Further, said lever 84 carries the impulse transmitting means in which the valve cone 61 is suspended.

The impulse transmitting means is shown to be of the type described in the Swedish Patent No. 170,709. Two bimetal rods 88 and 89 arranged substantially in alignment are connected by a distance piece 90 of heat insulating material, and the opposite end of the rod 88 is fixed to the lever 84 by means of a similar, heat insulating distance piece 91. The bimetal rod 89 carries the link 62 of the valve cone 61 at its free end.

The bimetal rods 88 and 89 are adapted to be heated by insulated windings 92 and 93 respectively included in electric circuits. When heated, the rods are bent in opposite directions. Thus, the rod 88 is bent downward to remove the valve cone 61 from its seat, while the rod 89 is bent upwards to throttle the valve. The circuit (not shown) for heating the rod 89 is, in some known way, adapted to be controlled by the condition to be regulated, i.e. the effective value of the current impulses supplied is changed in dependence on variations of said condition. The circuit for heating the rod 88 is adapted to be controlled manually to make possible a desired adjustment of the regulator. This circuit includes in series a rheostat 94 and a secondary coil 95 of a transformer. The primary transformer coil 96 may be connected to a common source of electricity (220 v. A.C.), and this voltage may be transformed into 20–25 v., for instance. The transformer must be of a type keeping a constant voltage in the secondary coil. The sliding contact 97 of the rheostat 94 is arranged to point at a dial 98 which may be graded in units of the condition to be regulated.

As the valve cone 61 has only a small weight and, moreover, is well balanced, the bimetal rod 89 may be dimensioned correspondingly weak, whereby it may be heated and cooled rapidly.

It is evident that the return mechanism shown in FIG. 2 may be used for obtaining proportionating, integrating and derivating return movements in the same manner as described in detail with reference to FIG. 1. Thus, the two bellows 67, 68 in FIG. 2 correspond to the cylinders 28, 29 and their pistons 38 and 43 respectively, in FIG. 1, while the needle valves 71, 72 in FIG. 2 correspond to the valves 31 and 30 respectively in FIG. 1. Further, the spring 80 in FIG. 2 corresponds to the spring 45 of the first embodiment, and the springs 40, 41 in FIG. 1 are substituted by the resilient action of the bellows 67. If, for instance, the needle valvees 71, 72 in FIG. 2 are adjusted in throttling positions, when the servo piston 14' moves downwards, then the bellows 68 has no possibility to contract rapidly enough to permit an unobstructed lift of the rod 78, and the result will be that the spring 80 is tensioned. To the extent liquid flows from the bellows 68 into the bellows 67 the latter will, however, be expanded, whereby the link 85 rotates the lever 84 in clockwise direction, and the valve cone 61 is opened to supply more air to the pump, so that the piston 14' is returned upwards. Due to the power accumulated in the spring 80 this motion will continue during a period of time, the length of which can be determined by adjusting the needle valves 71, 72. In this way the servo piston 14' can without oscillation be moved rapidly into its new operative position.

It will, of course, be understood that various changes may be made in the form, details and arrangement of the parts without departing from the scope of the invention. Thus, for instance, the invention also includes embodiments in which a cylinder with piston is used in combination with a bellows.

What I claim is:

1. A return mechanism for a regulator of the type in which means transmitting impulses from a condition to be regulated are arranged to adjust a valve member controlling the supply of pressure fluid to a pressure fluid driven servo motor mounted to control said condition in dependence on the impulses, comprising two closed vessels adapted to be filled with liquid and communicating through a passage containing a second valve, each vessel having a movable wall portion, whereby its volume may be varied, a container adapted to be filled with liquid up to a constant level above said vessels, a passage connecting one of the vessels to the container at a point below said liquid level and containing a third valve, means connecting a driven part of the servo motor to the movable wall portion of one of the vessels, and means connecting the movable wall portion of the other vessel to the first valve member, whereby said first valve may be influenced in returning direction by the servo motor to an extent determined by the adjusted positions of said second and third valves.

2. A return mechanism according to claim 1, in which the means connecting the servo motor to said movable wall portion includes a power accumulating elastic member.

3. A return mechanism according to claim 1, in which said vessels consist of bellows.

4. A return mechanism according to claim 1, in which the valve member controlling the supply of fluid to the servo motor is suspended in impulse transmitting means carried by a lever arranged to swing in a vertical plane, said lever being linked to the movable wall portion of one of the vessels.

5. A return mechanism according to claim 1, in which said container has an overflow opening and a conduit for supplying liquid to the container extends from means adapted to supply pressure fluid to the servo motor.

6. A regulator according to claim 4, in which a conical valve member inserted in a valve housing cooperates with an inlet opening provided centrally in a diaphragm wall of said housing.

7. A regulator according to claim 6, in which said conical valve member has a spindle extending through an opening provided in the opposite wall of the valve housing and communicating with a source of liquid, said two openings having about equal diameters, whereby the valve member will be substantially balanced.

References Cited in the file of this patent

UNITED STATES PATENTS

| | | |
|---|---|---|
| 2,147,977 | Källe | Feb. 21, 1939 |
| 2,276,591 | Ray | Mar. 17, 1942 |
| 2,517,718 | Säll | Aug. 8, 1950 |
| 2,598,177 | Källe | May 27, 1952 |

FOREIGN PATENTS

| | | |
|---|---|---|
| 173,763 | Sweden | Dec. 20, 1960 |